(12) United States Patent
Matheson et al.

(10) Patent No.: US 6,508,204 B1
(45) Date of Patent: Jan. 21, 2003

(54) METHOD AND APPARATUS FOR DISPERSING PIGEONS

(76) Inventors: Michael R. Matheson, 2011 W. Rosegarden La., Phoenix, AZ (US) 85027; Ronald A. Matheson, 2011 W. Rosegarden La., Phoenix, AZ (US) 85027

( * ) Notice: Subject to any disclaimer, the term of this patent is extended or adjusted under 35 U.S.C. 154(b) by 0 days.

(21) Appl. No.: 10/045,548
(22) Filed: Jan. 14, 2002
(51) Int. Cl.[7] ............................ A01K 37/00; E04H 9/16
(52) U.S. Cl. ........................ 119/713; 119/903; 52/101
(58) Field of Search ............................ 119/712, 713, 119/719, 903; 52/101

(56) References Cited

U.S. PATENT DOCUMENTS

| | | | | |
|---|---|---|---|---|
| 5,353,543 A | * | 10/1994 | Teraoka | 52/101 |
| 5,533,390 A | * | 7/1996 | Jones | 119/712 |
| 5,966,075 A | * | 10/1999 | Blanks | 119/712 |
| 5,974,998 A | * | 11/1999 | Gregg, III | 119/903 |
| 6,264,173 B1 | * | 7/2001 | Badger et al. | 52/101 |
| 6,385,915 B1 | * | 5/2002 | Keeler | 119/712 |
| 6,418,674 B1 | * | 7/2002 | Deraedt | 52/101 |

* cited by examiner

*Primary Examiner*—Charles T. Jordan
*Assistant Examiner*—Elizabeth Shaw
(74) *Attorney, Agent, or Firm*—Tod R. Nissle, P.C.

(57) ABSTRACT

A method is provided for dispersing pigeons from a building structure in which the pigeons roost. The method utilizes a horizontally oriented light beam. The light beam is positioned two to six inches above the surface on which the pigeons roost. The beam, when it is normal to a pigeon's eye and strikes the eye, causes the pigeon discomfort and makes it fly away from the building structure. The beam is utilized for at least three consecutive days.

1 Claim, 1 Drawing Sheet

METHOD AND APPARATUS FOR DISPERSING PIGEONS

This invention relates to apparatus and methods for dispersing birds from a particular location.

More particularly, the invention relates to a method and apparatus for dispersing pigeons from a building structure without killing the pigeons and without having to utilize toxic chemicals to poison the pigeons.

Birds pose a safety hazard at airports and in building structures. Birds also damage agricultural fields.

In particular, pigeons carry a variety of diseases which are dangerous and/or fatal to human beings. One of these diseases is histoplasmosis, which can cause death or blindness. The extreme health danger posed by pigeons has resulted in the decision to kill the pigeons in Trafalgar Square in London, England.

When pigeons roost in or on a building and produce droppings, the droppings function to carry and spread disease. After pigeons have roosted in a building for three months or more, the homing instinct of the pigeons makes it difficult to remove the pigeons without having to kill them. For example, once pigeons have roosted in a building, they are known to build nests on and sit on spikes or nails that are installed in their nesting area, even through the spikes cut the pigeons and cause them to bleed.

The United States Air Force has investigated a variety of methods to disperse pigeons and other birds. Each of the following methods had only a limited degree of success.

1. Ultrasonic devices. Air Force policy bans the use of ultrasonic devices because there evidently are no conclusive tests showing that such devices work.
2. Stuffed owls and rubber snakes. In Air Forces tests these devices had little or no affect on birds. Birds typically stand on or peck at these devices a few days after installation.
3. Rotating beacons and shiny objects. Lights, reflectors, etc. were found to affect birds at first by distracting or frightening them. The birds quickly, however, learn to recognize the steady sweep of the light or movement of the reflector. Strobe lights have shown no lasting results because the birds recognize that there is no real threat.
4. Loud music and other noises. When loud music is playing, birds usually move as far as possible from the sound source, but not out of the hanger. Human beings working in the hanger become aggravated by the noise, which aggravation is compounded when the birds realize there is no real threat.
5. Chemical irritants. Chemicals create a "hot foot" on a bird, or produce a tacky surface, making it uncomfortable for the bird to stand on the chemical. A principal disadvantage of chemical irritants is that they become covered with dust and debris and become ineffective.

Accordingly, it would be highly desirable to provide an improved method and apparatus for dispersing birds, particularly pigeons.

Therefore, it is a principal object of the instant invention to provide an improved method and apparatus for dispersing birds.

Another object of the invention is to provide an improved method and apparatus for dispersing pigeons without requiring the use of toxic chemicals or other weapons which kill the pigeons.

These and other, further and more specific objects of the invention will be apparent to those skilled in the art from the following detailed description thereof, taken in conjunction with the drawings in which.

Briefly, in accordance with the invention, I provide a method for dispersing a plurality of pigeons roosting in a building structure. The method includes the steps of identifying a roosting surface in the building on which the pigeons roost at night; providing a light source which, when activated, generates a beam that, on entering the eye of a pigeon generally normal to the eye, causes discomfort to the pigeon and causes the pigeon to fly away from the building structure; positioning the light source in the building structure such that when the light source is activated, the beam generated by the light source is generally horizontally oriented and travels over said roosting surface a distance above said surface in the range of two to six inches; activating at night the light source to produce the beam; and, repeating steps (c) and (d) during the nighttime on at least three consecutive days.

Figure 1:
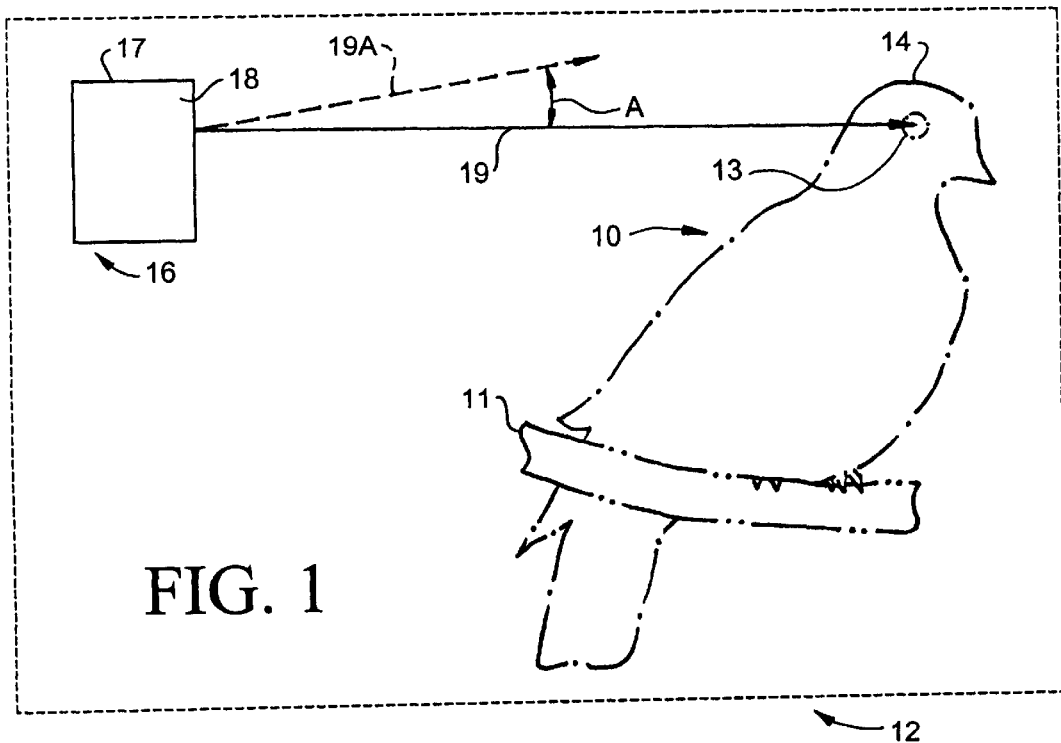
FIG. 1 is a perspective view illustrating the pigeon dispersal method of the invention.

Turning now to the drawings, which describe the presently preferred embodiments of the invention for the purpose of illustrating the practice thereof and not by way of limitation of the scope of the invention, and in which like reference characters refer to corresponding elements throughout the several views, FIG. 1 illustrates a pigeon 10 sitting on a roosting surface 11 in a building structure 12. Surface 11 can be a beam, a roof, a chimney, roof air vent, or any other area in a building when pigeons congregate and roost. Pigeon 10 includes head 14 and eyes 13, 15. Light source 16 produces light beam 17. Source 16 includes a housing having a top 17 and a front 18. Beam 19 is horizontally oriented, i.e. is generally parallel to the ground.

Figure 2:
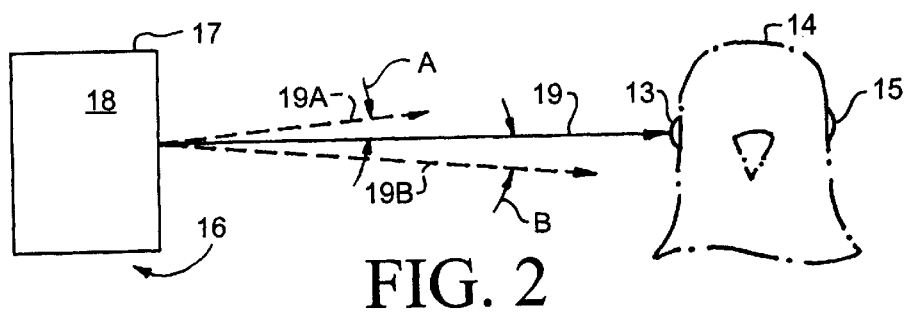
FIG. 2 is a front view further illustrating details of the pigeon dispersal method of the invention; and, FIG. 3 is a top view further illustrating details of the pigeon dispersal method of the invention.

The horizontal orientation of beam 19 is important in the practice of the invention because if the orientation of beam 19 becomes vertical or substantially vertical, it is unlikely that the beam will be substantially normal to the eye of a pigeon and produce discomfort sufficient to make the pigeon fly away from a building structure. Consequently, if beam 19 travels along a path 19A which is at an angle A of more than thirty degrees, this is not preferred in the practice of the invention. Angle A (and angle B in FIG. 2) preferably is no more than ten degrees.

Figure 3:
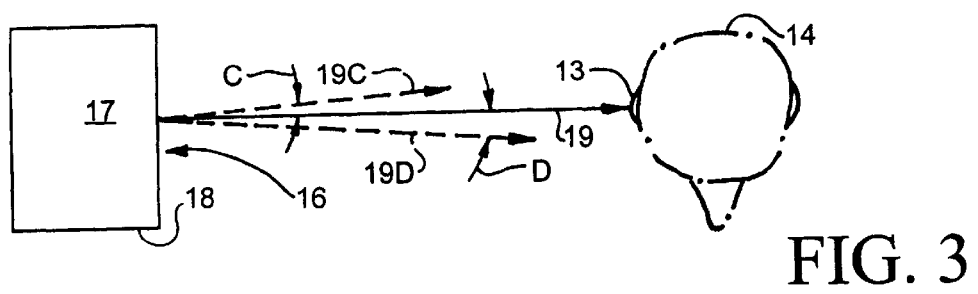

The paths of travel indicated by dashed lines 19A and 19B indicate the possible vertical inclination and declination of a light beam 19 from the preferred horizontal path of travel 19. In contrast, since FIG. 3 is a top view, the paths of travel indicated by dashed lines 19C and 19D indicate the possible lateral displacement from the preferred path of travel 19 of a light beam 19 entering the eye 13 of a pigeon.

As noted, beam 19 is preferably normal to eye 13 when it enters eye 13. A light beam is normal to eye 13 when (1) beam is horizontally oriented, (2) pigeon 10 is standing or sitting, (3) the side of the head of the pigeon is generally perpendicular to beam 19 in the manner indicated in FIGS. 2 and 3, and (4) the beam travels along path 19 (i.e., along a path normal to the side of head 14), or, travels along a path 19A, 19B, 19C, 19D which is not more than thirty degrees (preferably no more than ten degrees) from path 19. Accordingly, if a pigeon 10 is standing, walking, sitting, or laying down with its head in a normal upright position, if the light beam travels along path 19 (i.e., is horizontally oriented), and the side of the pigeon's head is normal to beam 19, then beam 19 is normal to eye 13.

When there are a plurality of pigeons at a roosting site in a hanger, roof, or other structure, causing one or two pigeons to leave can cause all or most of the other pigeons to leave. If a light beam 19 is directed through a roosting area 11 frequented by a plurality of pigeons, it is likely that a pigeon will walk, stand, sit, or lay down in front of the beam 19, have the beam 19 enter the pigeon's eye 13, cause discomfort to the pigeon, and cause the pigeon to leave the building structure, agricultural field, etc.

The intensity of beam 19 necessary to cause a pigeon 10 to leave a building site can vary and can be determined with minimal experimentation. For sake of example, a red laser siting beam of the type utilized on pistols or rifles has been found sufficient to cause pigeons to leave when the pigeons are at a distance from the laser beam source of ten to twenty-five yards. The intensity of beam 19 necessary to cause to pigeon 10 to leave will vary depending on the distance of the roosting site (and of the pigeon) from the light source, but can be readily determined with experimentation. A light beam, even a so-called collimated light beam, tends to diverge with distance, reducing the intensity of the portion of the beam that strikes a pigeon or other bird in the eye.

Beam 19 can be collimated or not collimated.

The color of beam 19 can vary as desired, however, at night a red light beam 19 has been found effective while during the day a yellow or green beam has been found effective.

When an adult pigeon is walking, standing, sitting, or laying down, the height of the pigeon's or other bird's eye above the ground or roosting area or surface 11 is normally in the range of two to six inches. Therefore beam 19 is positioned from two to six inches above surface 11. The distance of beam 19 above surface 11 can vary as desired, especially if the apparatus and method of the invention are utilized to disperse birds other than pigeons which are of a size different than that of pigeons. Regardless of the size of the bird or birds involved, the objective is to strike the bird's eye with a horizontal beam that is normal to the eye when the bird is walking, standing, sitting or laying down, as the case may be.

The apparatus of the invention can be utilized during the day or at night. A night time application is preferred because the pigeon's eyes have adapted to take in more light and are therefore more sensitive to beam 19 and are more likely to be frightened and feel discomfort and fly away from a building structure.

The intensity of beam 19 or of light emanating from source 16 can, if desired, be great enough to injure the eye 13 of a pigeon 10. This is not preferred in the practice of the invention. The intention of the invention is to make the intensity of beam 19 sufficient to cause discomfort without causing permanent injury, much like the discomfort experienced by a human being when glancing at the sun for a short period of time. Ordinarily, if an individual glances at the sun, the individual's eyes feel discomfort but are not permanently damaged. There is a risk that a pigeon could fly close to a light source, that light could enter the pigeon's eyes and cause injury. This risk appears minimal and, the invention appears to provide a viable alternative to killing or poisoning pigeons because of the diseases associated with the pigeons.

Pigeons have a strong homing instinct. Once a pigeon has returned to and roosted at a particular location for more than two or three months, the pigeon is "seated" at that location and it often is difficult to convince the pigeon to leave and locate another roosting location.

It is believed that prior art attempts to make pigeons leave an area have failed for several reasons.

First, attempts which merely produce a scare factor—like stuffed owls and rubber snakes—are quickly apprised by the pigeons as not posing a danger.

Second, the strobes and other lights that have been used do not appear to have caused any significant discomfort to birds, often because the light is not normal to the head and eye of the pigeon and, even if it is normal, the intensity of the light is not sufficient to cause the pigeon discomfort. Pigeons, as do more animals who can see, are believed to be sensitive to the possibility of losing their sight (if nothing else they are instinctively afraid of losing their sight), but at the same time quickly learn when a light source poses no real danger.

Third, simply causing a pigeon discomfort once is not believed sufficient to cause the pigeon to leave a site where it is "seated" because it has roosted at the site for more than two months or three months. The light beam of the invention normally must be used usually during at least three consecutive days (during daytime, nighttime, or both) in a relatively short period of time. As used herein, consecutive days mean using the invention during (n-2) days during a period n days long. For example, during a seven day period, the invention must be used during at least five days. During a ten day period, the invention must be used during at least eight days. And so on. It is preferred, however, that the invention be used during each day of a set period of time. This usage is called a true consecutive day usage. During a true consecutive day usage, the invention is used each day during a selected period n days long. Each day the invention is utilized, it is preferably utilized at least during a selected period of time during the day. For example, there may be a particular time of afternoon or evening when the pigeons or other birds come to roost for the night. Or, if the invention is used in agricultural fields, woods, etc., there may be a particular time of afternoon or night when the pigeons or other birds land in a field to eat seeds and other food that is on or in the ground. In some cases, the light beam 19 may have to be used four to ten consecutive days or more to remove pigeons from a roosting site. This could especially be the case if pigeons have roosted at a selected building structure or other location for two or three years. At locations where pigeons or other birds are not "seated" and are not roosting, using the apparatus of the invention for at least a part of the day for only one, or two, or three days may be sufficient.

Fourth, causing the pigeon visual discomfort at night is preferred because daylight dilutes the effectiveness of a beam produced by apparatus 16.

When light beam 19 is used during a twenty-four hour day, the time beam 19 is "on" can vary as desired. Beam 19 can be turned on every minute during a day, can only be turned on at night, can be turned on during a particular portion of the night (or daytime), etc. depending on the habits of the pigeons, use of the building structure, and any other factors which might be taken into account. Regardless of how long during each day beam 19 is turned on, the objective is to make it likely that at least one pigeon in a group of pigeons at a roosting site will be struck in the eye 13 by beam 19 so that the pigeon feels discomfort and flies away from the roosting site or other site, preferably flying away immediately after beam 19 strikes the pigeon 10 in eye 13.

Beam 19 can shine along one fixed path, can be rotated like the light in a lighthouse, can repeatedly turn on and off, can pulsate so the intensity of the beam 19 varies, etc.

As used herein, a pigeon roosts at a selected site or building structure if the pigeon returns to the site at least once each day for a period of at least seven consecutive days. When a pigeon returns to a site during the night each day this is a further indication that the pigeon is roosting at the site.

As used herein, a light beam 19 causes discomfort to a pigeon if when (1) light beam 19 is normal to the pigeon's eye 13 (i.e., normal when angles A to D are thirty degrees or less, preferably ten degrees or less), and (2) pigeon 10 flies away from a building structure when beam 19 enters eye 13.

We claim:

1. A method for dispersing a plurality of pigeons from a building structure in which the pigeons roost, said method comprising the steps of (a) identifying a roosting surface in the building on which the pigeons roost at night;

(b) providing a light source which, when activated, generates a beam that, on entering the eye of a pigeon normal to the eye, causes discomfort to the pigeon and causes the pigeon to fly away from the building structure;

(c) positioning said light source in the building structure such that when said light source is activated, said beam is generally horizontally oriented and travels over said roosting surface a distance above said surface in the range of two to six inches;

(d) activating at night said light source to produce said beam; and, (e) repeating steps (c) and (d) during the night time on at least three consecutive days.

* * * * *